United States Patent [19]
Verlinde

[11] 3,872,671
[45] Mar. 25, 1975

[54] CONTROL DEVICE FOR A HYDRAULIC DRIVE MOTOR

[75] Inventor: August Verlinde, Fournes en Weppes, France

[73] Assignee: Verlinde S.A., Loos, France

[22] Filed: May 11, 1973

[21] Appl. No.: 359,407

[30] Foreign Application Priority Data
May 23, 1972  France .............................. 72.19588

[52] U.S. Cl......................... 60/460, 60/466, 60/493
[51] Int. Cl............................................. F15b 11/16
[58] Field of Search ......... 60/493, 460, 466; 91/420

[56] References Cited
UNITED STATES PATENTS

| | | | |
|---|---|---|---|
| 3,125,324 | 3/1964 | Vivier .................................. | 91/420 |
| 3,126,706 | 3/1964 | Dettinger ............................. | 60/460 |
| 3,330,531 | 7/1967 | Slator et al. ........................... | 91/42 |
| 3,601,235 | 8/1971 | Huf ...................................... | 60/460 |
| 3,747,350 | 7/1973 | West et al. ............................ | 60/493 |

Primary Examiner—Edgar W. Geoghegan
Assistant Examiner—A. M. Zupcic
Attorney, Agent, or Firm—Cameron, Kerkam, Sutton, Stowell & Stowell

[57] ABSTRACT

The invention relates to a control device for a hydraulic drive motor, such as a rotating motor or a screw jack, such that it can function in its two displacement directions, that it can be an engine functioning in rotation or in translation and with a manually adjustable speed, an optimal acceleration or deceleration is automatically obtained during operation or standstill, or simply during the manual control of the change of speeds of the said motor and its load.

6 Claims, 3 Drawing Figures

CONTROL DEVICE FOR A HYDRAULIC DRIVE MOTOR

Feed installations of a hydraulic drive motor provided with a possibility of braking the engine and its load as well as such installations which enable the speed of this engine to be varied are known. In these installations, the hydraulic fluid is displaced under the action of a pump in a "closed" circuit in which braking is obtained by reversing the functions of the pump and the drive motor and the motor functioning as a pump by its inertia and above all that of the load, causes the pump to function as a motor which in turn drives the brake motor which controls the said pump. Apart from the fact that such an installation in closed circuit necessitates a separate loading circuit and thus in particular another pump, to vary the speed it was necessary to mount a pump with a generally variable delivery in the two directions of circulation of the fluid, which considerably increased the cost-price of the said installation. In order to avoid these disadvantages and in particular to avoid a separate loading circuit, the object of the present invention is an installation in "open" circuit capable of being fed by a pump having a constant delivery and with a single fluid circulation direction, and in which, as is known, the variation of the speed is obtained by a controllable throttle valve interposed between the said pump and the drive motor, so as to divide the delivery of the pump into two streams, one feeding the drive motor, the other returning to the reservoir by passing through a control valve.

Unfortunately, no such installations in "open" circuit comprising simple means for obtaining a braking action and a control of the acceleration and deceleration have been available. Furthermore, the known installations of this type cannot be used to control heavy machines which must frequently be actuated or stopped, such as for example rolling bridges.

Furthermore, in the known installations of this type, the position of the control valve depends directly on the pressure in the circuit and not on a single delivery, which thus distorts the control of the delivery passing towards the drive motor unless these installations are provided with expensive means. This delivery is likewise biased by the direct mechanical control of the regulator upstream of the drive motor, without taking into account the total value of the delivery of the installation and/or with the means influenced by the differences in temperature and thus the viscosity of the fluid. This obviously impedes the use of the installation in places subjected to severe variations in temperature.

An object of the present invention is likewise to avoid these latter faults in order to make use of a control of the delivery which is not very troublesome but quite precise.

For this purpose, the invention relates to an installation of the type described above, and is characterised in that all the return lines to the reservoir are made through a common pipe.

The invention will be better understood with the aid of the following description given by way of non-limitative example and with reference to the accompanying drawing in which.

Figure 1:
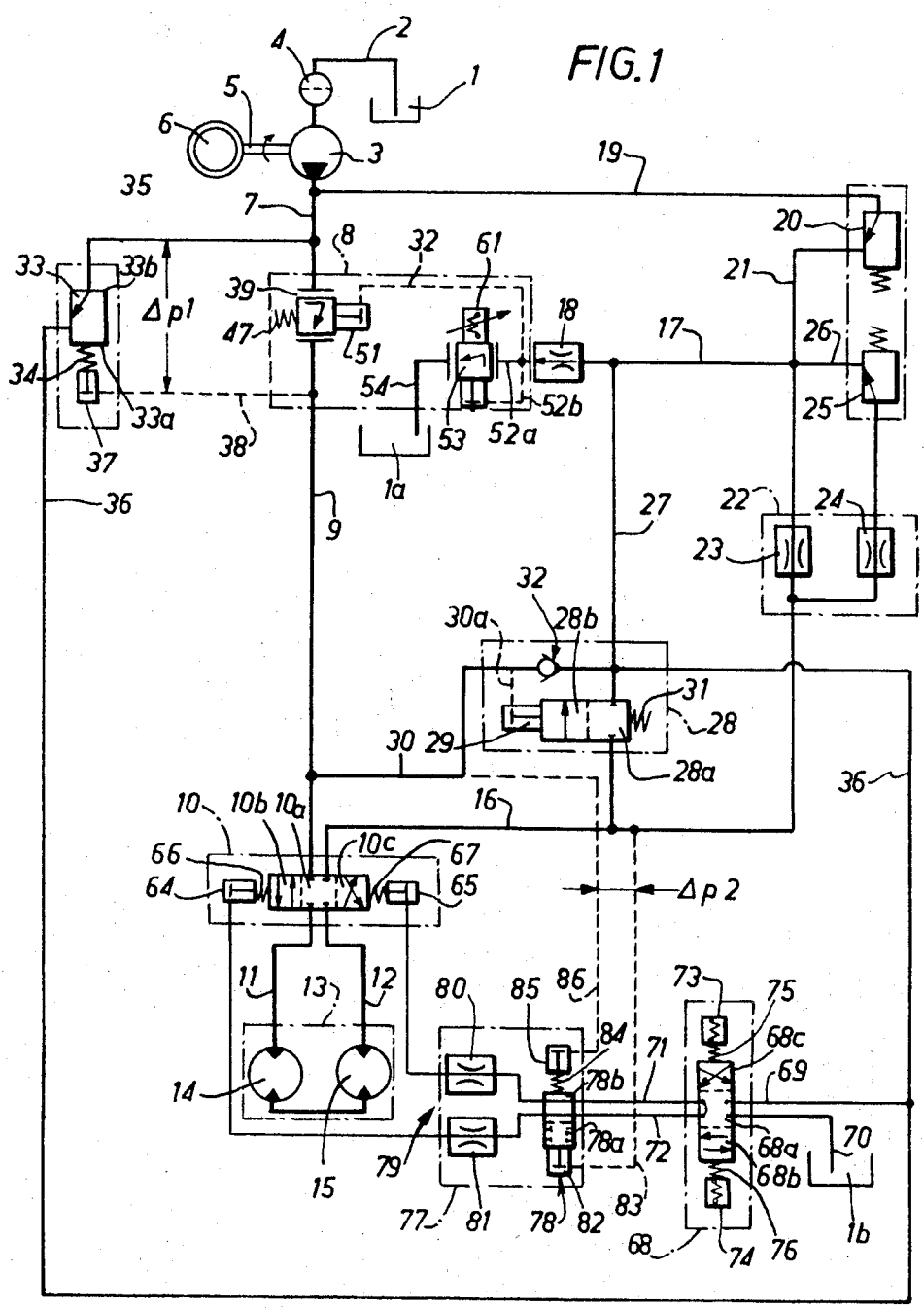
FIG. 1 is a circuit diagram of the installation.

The installation comprises a reservoir 1 open to the atmosphere. In the reservoir 1 is immersed the inlet pipe 2 of a pump 3 of constant cylinder capacity and with a single fluid circulation direction.

A filter 4 is provided on the pipe 2. The pump 3 is driven in rotation by a shaft 5 of an electric motor 6 at constant speed.

The pump 3 has a discharge pipe 7 which ends in a regulator unit 8, the outlet of which is connected by a pipe 9 to the inlet of a main distributor 10 having three positions (a neutral position 10a, a forward position 10b and a reverse position 10c) whose discharge orifices are connected by pipes 11 and 12 to a drive motor unit 13. In the embodiment illustrated, the drive motor unit comprises two rotating motors 14 and 15 with a two-way circulation direction and a constant cylinder capacity. The motors may be replaced by a double-acting screw jack.

The outlet of this main distributor 10 is connected to an outlet pipe 16 feeding a reservoir 1a via a return pipe 17 in which is provided a fixed throttle valve 18 which maintains a certain pressure in the circuit, in a way known in the open circuit installation.

A safety valve 20 whose outlet pipe 21 passes fluid to the reservoir 1a is connected via a pipe 19 to the outlet of the pump 3.

In the present installation this return is carried out through the return pipe 17 and said throttle valve 18.

In order to brake the drive motor 13, the outlet pipe 16 of the main distributor 10 is connected to the return pipe 17 to the reservoir by means of a brake unit 22 for throttling the fluid which changes the energy to be absorbed into heat. In the embodiment illustrated, the brake unit 22 comprises two throttle valves 23 and 24 mounted in parallel the throttle valve 23 only having a very small aperture in relation to the other throttle valve 24, whose actuation is only allowed at the beginning of braking, in the event of the strongest pressure in the return pipeline, owing to a safety valve 25 mounted in series with the large throttle valve 24, and in parallel with the small throttle valve. The outlet pipe 26 of the safety valve 25 is connected on the return pipe 17 to the reservoir 1a.

Thus, at the beginning of braking, the fluid can flow away through the orifices of the two throttle valves 23 and 24 whilst at the end of braking it can only flow away through the orifice of the smallest throttle valve 23. A progressive braking is thus achieved.

A similar effect would obviously be obtained if the two throttle valves 23 and 24 were mounted in series, the safety valve 25 remains mounted in parallel with the small throttle valve 23, since in this case at the beginning of braking, the delivery of the larger throttle valve 24 would be used whilst at the end of braking only the delivery of the small throttle valve 23 would be available.

In order at the appropriate time to cancel this braking action, the brake unit 22 and its safety valve 25 are short-circuited by a pipe 27 ensuring the connection between the outlet pipe 16 of the main distributor 10 and the return pipe 17 to the reservoir 1a. In this pipe 27 is mounted a valve 28 having two positions, namely a "closed" position 28a and an "open" position 28b.

The valve 28 is normally in the "open" position 28b under the action of a guide device 29 connected to the inlet pipe 9 to the main distributor 10 through the pipes 30 and 30a the pressure in this pipe 9 counteracting the action of a return spring 31 of the valve 28 which tends to keep the valve in the "closed" position 28a. This spring acts as soon as the pressure in the inlet pipe 9 drops, such as when the pump stops or the regulator 8 closes significantly thereby causing the braking action.

Brake unit 22, safety valve 25 and valve 28 form a braking assembly.

In order to avoid cavitation effect in the drive motor 13, during this drop in pressure in the inlet pipe 9 to the main distributor 10, an automatic loading device 32 is provided which removes the fluid in the return pipe 17 in order to pass it into the inlet pipe 9 to the main distributor 10.

The automatic loading device 32 consists of a simple non-return valve, preventing a direct passage in the direction of the inlet towards the return to the reservoir.

In order to control the variation in the flow in the drive motor unit 13 there is provided a control valve 33 with direct control by the guide fluid and which is returned to the closed position by a spring 34. The inlet of the valve 33 is connected by a branch pipe 35 with the inlet of the regulator unit 8. The outlet of the valve 33 is connected by a pipe 36 to the return pipe 17 to the reservoir and this likewise upstream of the fixed throttle valve 18 maintains a sufficient pressure in said pipe 17.

On the surface 33a opposite that (33b) directly receiving the pressure of the fluid of the branch pipe 35, there is provided in addition to the spring 34 mentioned above, a guide device 37 subjected, via a pipe 38, to the pressure of the fluid downstream of the regulator unit 8. Owing to this, it is the difference $\Delta p_1$ of the pressures at the outlet of the pump 3 and at the inlet of the main distributor 10 which controls the control valve 33. The division of the delivery is obtained without the influence of the actual pressure in the circuit.

Figure 2:
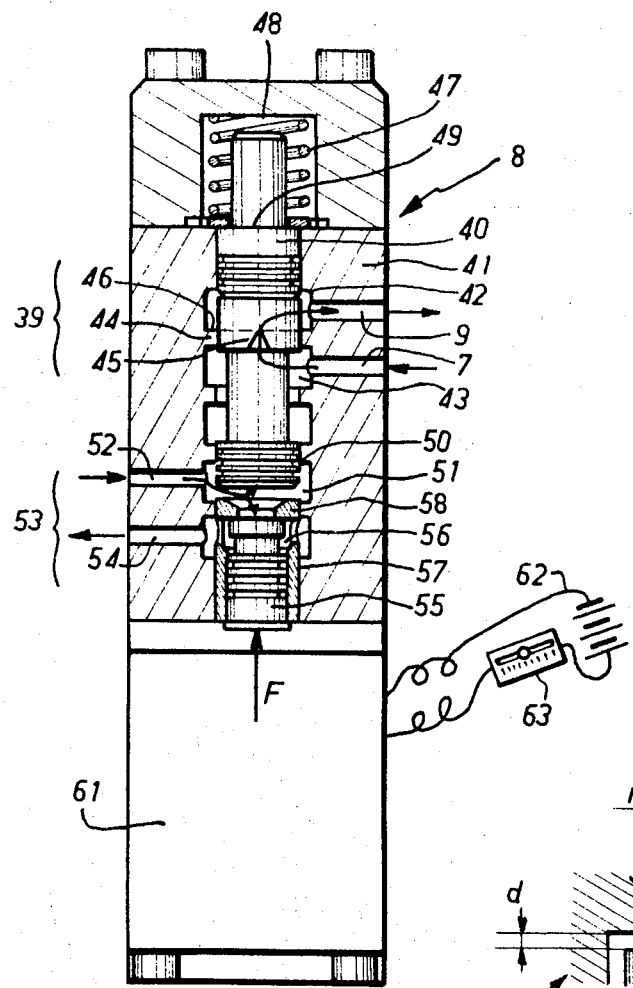
FIG. 2 is an axial cross-sectional view of the regulator.

The regulator unit 8 (FIG. 2) mainly comprises a controllable throttle valve 39 comprising a piston 40 sliding inside a sleeve 41.

Grooves 42 and 43 are made in the sleeve and are separated by a drilled partition 44 in order to be hermetically adjusted on the piston 40 on the outer surface of which is formed, parallel to the axis, at least one recess 45 of a triangular shape so that according to the longitudinal position of the piston 40 and thus of this recess 45, in relation to the active surface 46 of the partition 44, a more or less significant or possibly non-existent passage is left between the two grooves 42, 43 of the sleeve 41.

One of the pipes 7 and 9 ends in each of these grooves 42, 43, one pipe coming from the pump 3 and the other passing to the main distributor 10.

This throttle valve 39 is normally closed under the action of a spring 47 positioned between and bearing against the bottom 48 of the sleeve 41 and the surface 49 of a screw cutting of the piston 40.

In order to open the throttle valve 39 to a greater or lesser extent, it is necessary to bear on the other end (50) of the piston 41 with a force of varying intensity as a function of the desired aperture.

For this, at this end 50 of the piston 40, the sleeve forms a chamber 51 forming the guide device of the piston. For this purpose, into this chamber opens a feed pipe 52 for the guide fluid taken at the end 52a of the return pipe 17 to the reservoir 1a, downstream of the fixed throttle valve 18 for maintaining the pressure in the circuit; at this point of the circuit, the pressure would so to speak be nil, the fluid of the pipe 52a passing through a pressure regulator 53 before being discharged to the reservoir 1a by a pipe 54.

This regulator is designed so as to regulate the guide pressure independently, not only of the viscosity of the fluid which varies as a function of its temperature, but above all of the delivery, given that all the return lines pass through this regulator to the reservoir, including that of the pressure-limiting device composed of safety valves 20, 25.

Figure 3:
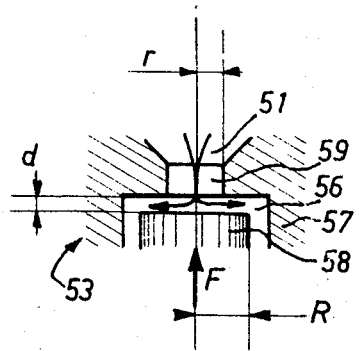
FIG. 3 is a detail on a large scale of this regulator unit.

For this purpose, the throttle valve 53 (FIGS. 2 and 3) comprises a piston 55 pressed at one of its ends by a force F and the other end, located in a chamber 56 of the guide sleeve 57 of the piston, supporting a plate 58 facing the orifice 59 connecting the inlet chamber 51 of the fluid and the outlet chamber 56 by the return pipe 54 to the reservoir.

Thus formed, the pressure of the fluid in the inlet pipe 52 is in constant ratio to the force F this ratio being essentially a function of the proportion of the radii R of the plate 58 and r of the orifice 59 which radii are constant.

The variation of the force F thus enables the pressure in the chamber 51 and thus the guide pressure of the throttle valve 39 to be altered proportionately independently of the distance d between the plate 58 and the bottom 60 of the sleeve 57 and thus without influencing the delivery towards the reservoir.

The piston 55 and plate 58 assembly is thus maintained in equilibrium by the pressure obtained (52b), on the one hand, and by the variable force F. In order to obtain this variable force, it is necessary to use an electromagnet with a plunger core 61 fed in continuous current by a circuit 62 in which is interposed a variable potentiometer 63.

For handling, the main distributor 10 comprises a primary control 64, 65 by guide fluid at each of its ends and a neutral position return by springs 66 and 67.

The guide fluid of the main distributor 10 is provided by an auxiliary distributor 68 whose inlet orifice is connected by a pipe 69 to the return pipe 36 to the reservoir of the control valve 33. Its outlet orifice is freely connected to the reservoir 1b by a pipe 70. The two discharge orifices of this auxiliary distributor are connected to the pipes 71 and 72 passing towards the guide devices of the main distributor 10.

The auxiliary distributor has three positions, a neutral centre position 68a, and two opposite end positions 68b, 68c, for the circulation of the fluid and thus the control of the drive motor in one direction or the other.

The auxiliary distributor has a primary control by electromagnets 73, 74 with return by springs 75, 76.

In order to prevent the main distributor 10 from being brought back to its neutral position, thereby blocking the drive motor before the end of braking, the unit 77 comprising an insulating valve 78 and a time delay unit 79 is mounted on the guide pipes 71, 72 of the main distributor 10.

The time delay unit comprises two throttle valves 80 and 81 each controlling one of the pipes 71, 72.

The insulating valve is a distributor having two positions, a neutral position 78a and a moving position 78b.

This valve 78 is caused to close by a guide device 82 connected by a pipe 83 to the return circuit 16, upstream of the brake unit 22. It is opened by a spring 84.

In the embodiment illustrated, this valve 78 comprises a guide device 85 connected by a pipe 86 to the inlet pipe 9 to the main distributor and owing to this the valve is guided by the pressure difference $\Delta p_2$ between the inlet and outlet of the drive motor 13.

Thus, as soon as the drive motor slows down, the pressure at the return line increases and, in inverse proportion to the inlet pressure, the valve is caused to close in order to avoid the main distributor returning to the neutral position and blocking this motor however great the pressure upstream of the brake circuit.

What is claimed is:

1. Control device for a hydraulic drive motor or screw jack having an installation in open circuit and a reservoir including a constant delivery pump, a safety valve for the pump to guard against excess pressure, a return towards the reservoir for said safety valve, the pump being connected to an inlet aperture of a main distributor controlling the drive motor, a controllable throttle valve between the pump and the main distributor, the pressure differential across this throttle valve acting on a control valve to allow the (return to) outflow towards the reservoir of an amount of the delivery of the pump by a return, a braking unit for the (hydraulic fluid feeding) exhaust pressure down stream of the drive motor and a control means for the throttle valve, the improvement consisting of a single common pipe receiving the returns of the installation and connected to the reservoir, said common pipe including a fixed throttle valve to maintain a predetermined pressure in the circuit, an outlet for said fixed throttle valve including a pressure regulator discharging to the reservoir and creating a regulated pressure up stream there of without influencing the outflow across the pressure regulator, means for actuating said pressure regulator, a manually adjustable remote speed control driving said last means, said regulated pressure actuating the control means for the controllable throttle valve between the pump and the main distributor.

2. A device according to claim 1 including an outlet for the main distributor of the drive motor, two pipes connecting said outlet to the common pipe of return to the reservoir one of the pipes being connected to the braking device and the other of the pipes being connected to an automatic valve, control means for the automatic valve driven by the pressure at the inlet of the drive motor for stopping the flow in said other pipe when the pressure falls below a determined threshold, said braking unit receiving the totality of flow from the drive motor having two throttle devices of different calibres and a valve relieving excess of pressure connected in parallel to the throttle device of the smallest calibre and connected in series with the throttle device of larger calibre.

3. A device according to claim 1 wherein the pressure regulator comprises an inlet chamber which receives the flow whose pressure is to be regulated, said chamber being connected through a free return chamber to the reservoir, a calibrated aperture between said chambers, a plate of a determined surface in said return chamber drawn towards said aperture by a force of adjustable intensity provided by the means for actuating the pressure regulator and effecting a counter-pressure automatically balancing the pressure in said inlet chamber, said force being, in relation to this regulated pressure, in a constant ratio, a function of the proportions between the area of the aperture and the surface of the plate.

4. A device according to claim 3, wherein the means for actuating the pressure regulator include an electromagnet, a plunger core for said electromagnet bearing on said plate, said electromagnet being fed with a direct current and a variable potentiometer controlling the direct current, said potentiometer realizing the manually adjustable remote speed control.

5. A device according to claim 1, including an auxiliary circuit controlling the main distributor fed by the return line to the reservoir, an auxiliary distributor in and controlling said auxiliary circuit, two electromagnets controlling said auxiliary distributor, springs for said electromagnets to return the auxiliary distributor to a neutral position, pipes connecting said auxiliary distributor to said main distributor, an insulation valve connected in said pipes and means actuated by the pressure upstream of the braking circuit actuating said insulation valve so that the main distributor cannot come back to the neutral position and lock the drive motor before the end of braking.

6. A device according to claim 5, including throttle valves in said pipes between the main distributor and said insulation valve which brake the passage of the fluid and thereby slow down the return of the main distributor.

* * * * *